Nov. 21, 1950 P. H. HOUSTON 2,530,881
SUN SHIELD
Filed Oct. 28, 1947

INVENTOR.
Paul H. Houston
BY

Patented Nov. 21, 1950

2,530,881

UNITED STATES PATENT OFFICE 2,530,881

SUN SHIELD

Paul H. Houston, Fairmont, W. Va.

Application October 28, 1947, Serial No. 782,596

2 Claims. (Cl. 2—12)

The invention relates to sun shields to protect the eyes. While many eye shades, sun glasses, and goggles have been devised, yet they do not fully answer the purpose, and this is of particular importance now that it is a common practice to be exposed to the sun without the eye protection of a hat.

In the main, the previously known eye shields, sun glasses, and goggles depend upon the use of translucent colored material to filter the rays of light to diminish the intensity thereof. This results in giving an unnatural appearance to objects viewed.

Also, previously known eye shades obstruct the vision to more or less extent. And when sun glasses and goggles are worn in the sunlight, without a hat, a great amount of light strikes the eyes directly, from around the top, bottom and sides of the glasses. This light causes the pupils of the eyes to contract, allowing less light to reach the retina, making it difficult to discern objects clearly, particularly in the shadows.

One of the objects of the present invention is to provide a sun shield which will give full protection to the eyes and yet which will not obstruct the vision to the slightest extent.

Another object of the invention is to provide such a device which will not change the color or appearance of objects viewed.

A further object of the invention is to provide a device which will fully protect the eyes from the direct and reflected rays from the sun, and thereby prevent reduced vision and possible harm to the eyes.

Other objects of the invention are to provide a device of this character which is very simple in construction, inexpensive in manufacture, and pleasing in appearance.

Various other objects and advantages of the invention will be apparent from the following detailed description, when taken in connection with the accompanying drawings, in which.

Figure 1:
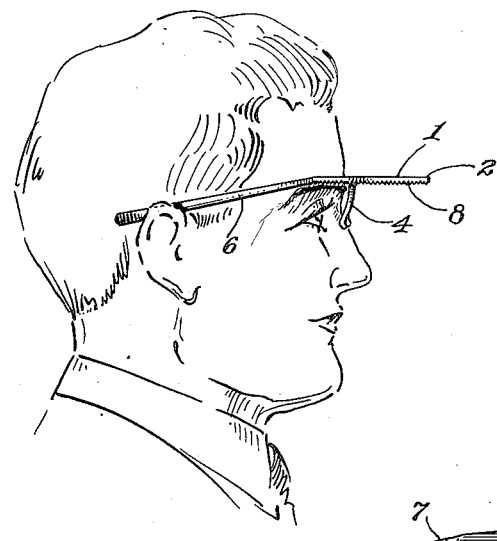
Figure 1 is a side elevational view of the improved sun shield on a wearer's head.
Figure 2:
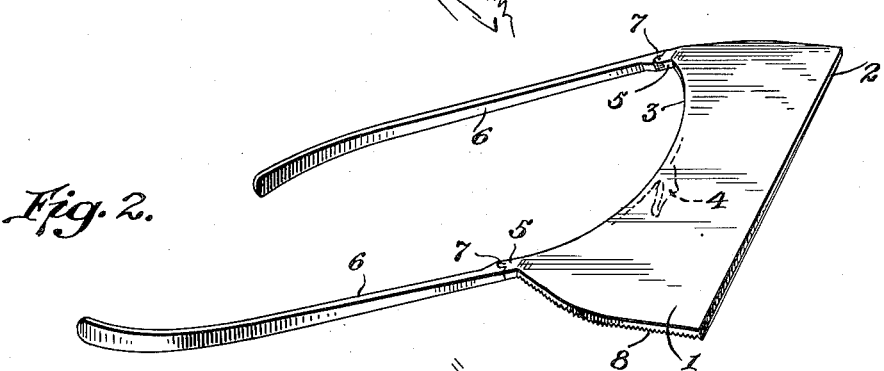
Figure 2 is a perspective view of the device.

Referring to the drawings in more detail numeral 1 indicates the shield body member. This member, in the specific form illustrated, has a straight forward edge 2, and a curved rear edge 3 to fit neatly about the forehead and prevent the passage of light rays between the shield and the forehead.

Numeral 4 refers to a nose-piece which is preferably formed integral with the shield body member 1. This nose-piece may be of any desired shape and if desired it may be transparent to change the appearance of the wearer as little as possible.

The rear end portions of the shield body member are provided with short rearwardly extending projections 5, to which the temples 6 are hinged, as indicated by the numeral 7. The rear faces of the short projection 5 are inclined so that the temples incline downwardly from the shield body member. It will be noted, by reference to Figure 1 that both the body member and the temples are above the eyes, so that there is no obstruction of the vision. The temples shown in the drawings are of the straight type, but of course curved temples to fit over the ears, can be employed if desired.

As previously mentioned, eye shields, sun glasses, and goggles heretofore known usually employ a translucent colored material to filter the rays and thus diminish their intensity. The purpose of the present invention is to protect the eyes from the rays of the sun and to do this without changing the appearance of objects viewed and without any obstruction of the vision.

To this end, the shield body member is preferably flat throughout, and projects forward and laterally in a horizontal plane above the eyes. And as previously mentioned the temples incline upwardly from the ears to the point where they are hinged to the shield body, so that neither the shield body nor the temples interfere in any way with full vision.

The shield body member is made of an opaque material, or at least the lower side of the body member is made of opaque material. It is essential for the purpose of the present invention that the lower side be made of opaque material, to shield the eyes from the rays of the sun, but for purposes of appearance or for other reasons the upper side can be made of any material and of any color desired.

It is also important to note that the under surface of the shield has a dull finish, to reduce reflection, as distinguished from the glossy surfaces of most eye shades, and the color of the underside is preferably black. The invention is not restricted to the use of any particular material for the shield body, but I preferably employ a plastic material. And ordinarily the body member will be made of a single, substantially thick, opaque sheet of such material. But as stated hereinbefore, it is essential only that the underside of the shield body be of the opaque material, the remainder being of any other desired material.

From the description thus far, it will be apparent that I have devised a simple and inexpensive sun shield which will give protection from the direct rays of the sun without the protection of a hat. And reflected light is greatly reduced by having the under surface of black material with a dull finish.

Figure 3:
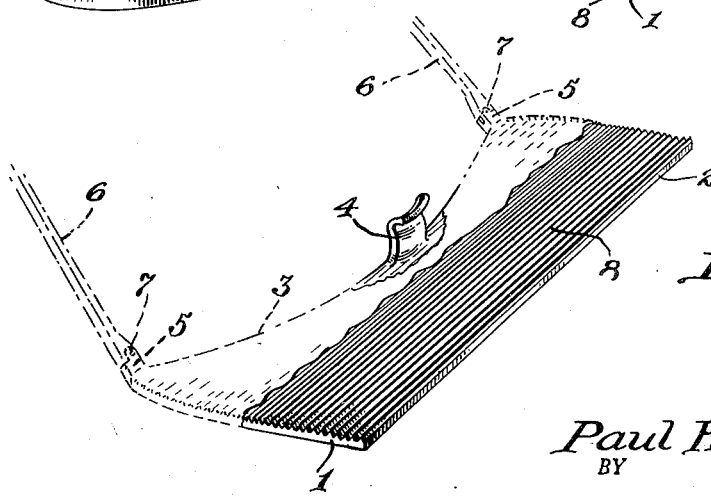
Figure 3 is a fragmentary perspective view of the underside of the shield; part of the shield being in full lines, and the remainder being merely suggested.

However, the present invention contemplates additional means for greatly reducing reflection. By reference to the drawings, and particularly to Figure 3, it will be noted that the under surface of the body member is ribbed or corrugated, as indicated by numeral 8. These ribs or corrugations extend the full width of the shield body member, and also preferably cover the entire under surface from front to back. This, in effect, very greatly reduces the area of possible reflection, for so far as the eyes are concerned, when the shield is in use the only possible reflecting surface is the lowermost edges of the ribs or corrugations. Various other forms of a roughened under surface for reflection-reducing purposes could be substituted for the particular rib or corrugation construction illustrated.

The present invention is simple in construction, inexpensive in manufacture, and attractive in appearance. It gives a full, unobstructed vision in all directions. It does not change the appearance of objects viewed. And it fully protects the eyes from the direct and reflected rays of the sun, without the protection of a hat.

Having fully described the invention, what I claim is:

1. A sun shield including a shield body member, said body member being substantially flat throughout and when in wearing position being in substantially a horizontal plane above the eyes, whereby it does not obstruct vision in any direction, the rear edge of the body member being shaped to fit neatly about the forehead to prevent the passage of light rays between the forehead and the body member, a nose-piece carried by the body member, temples hinged to the rear ends of the body member and inclined downwardly therefrom, said body member having a substantially opaque underside, and the underside having a roughened surface to reduce reflection.

2. A sun shield including a shield body member, said body member being substantially flat throughout and when in wearing position being in substantially a horizontal plane above the eyes, whereby it does not obstruct vision in any direction, the rear edge of the body member being shaped to fit neatly about the forehead to prevent the passage of light rays between the forehead and the body member, a nose-piece carried by the body member, temples hinged to the rear ends of the body member and inclined downwardly therefrom, said body member having a substantially opaque underside, and ribs on the underside of the body member and extending crosswise thereof, to reduce reflection.

PAUL H. HOUSTON.

REFERENCES CITED

The following references are of record in the file of this patent:

UNITED STATES PATENTS

| Number | Name | Date |
|---|---|---|
| 542,015 | Goodman | July 2, 1895 |
| 797,143 | Newlin | Aug. 15, 1905 |
| 1,255,430 | King | Feb. 5, 1918 |
| 2,257,232 | Flint et al. | Sept. 30, 1941 |

FOREIGN PATENTS

| Number | Country | Date |
|---|---|---|
| 233,480 | Great Britain | May 14, 1925 |
| 290,771 | Great Britain | May 24, 1928 |